US012763459B2

(12) United States Patent
Bajec Strle et al.

(10) Patent No.: US 12,763,459 B2
(45) Date of Patent: Oct. 13, 2026

(54) RADOME FOR A RADAR DEVICE OF OR FOR A VEHICLE, RADAR DEVICE COMPRISING SUCH A RADOME, CLADDING COMPONENT AND VEHICLE WITH SUCH A RADAR DEVICE

(71) Applicant: Hella Saturnus Slovenija d.o.o., Ljubljana (SI)

(72) Inventors: Alenka Bajec Strle, Ljubljana (SI); Goran Vignjevic, Ljubljana (SI); Marko Virsek, Grosuplje (SI); Alen Bucar, Trebnje (SI); Tomaz Stajner, Ljubljana (SI); Andraz Tekavcic, Kranj (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 35 days.

(21) Appl. No.: 18/946,521

(22) Filed: Nov. 13, 2024

(65) Prior Publication Data

US 2025/0167437 A1 May 22, 2025

(30) Foreign Application Priority Data

Nov. 17, 2023 (EP) .................................... 23210675

(51) Int. Cl.

| | |
|---|---|
| ***H01Q 1/42*** | (2006.01) |
| ***F21S 41/141*** | (2018.01) |
| *F21W 107/10* | (2018.01) |

(52) U.S. Cl.
CPC .............. *H01Q 1/42* (2013.01); *F21S 41/141* (2018.01); *F21W 2107/10* (2018.01)

(58) Field of Classification Search
CPC ......... H01Q 1/42; H01Q 1/422; H01Q 1/3233
See application file for complete search history.

(56) References Cited

U.S. PATENT DOCUMENTS

2022/0357021 A1 11/2022 Paule et al.

FOREIGN PATENT DOCUMENTS

| | | | | |
|---|---|---|---|---|
| DE | 102018009270 A1 | 5/2020 | | |
| EP | 3563449 B1 | 6/2021 | | |
| JP | 2009018790 A | 1/2009 | | |
| WO | WO-2018101165 A1 * | 6/2018 | ........... | G01S 13/931 |
| WO | 2021018422 A1 | 2/2021 | | |
| WO | 2021047772 A1 | 3/2021 | | |

* cited by examiner

*Primary Examiner* — Hoang V Nguyen
(74) *Attorney, Agent, or Firm* — Husch Blackwell LLP

(57) ABSTRACT

A radome includes a cover member made of a radar-transparent resin, a structural member made of a radar-transparent resin. The cover member encloses the structural member, and each are fastened to the other in a fixing section. The fixing section is formed by the cover member or the structural member, and is protected by a protective layer applied to the structural member and extending into or overlapping the fixing section. Alternatively, the fixing section is formed by the cover member or a housing, and is covered by the housing or the housing extends into or overlaps the fixing section. The housing forms an opening for the radar waves (λr).

16 Claims, 2 Drawing Sheets

RADOME FOR A RADAR DEVICE OF OR FOR A VEHICLE, RADAR DEVICE COMPRISING SUCH A RADOME, CLADDING COMPONENT AND VEHICLE WITH SUCH A RADAR DEVICE

CROSS REFERENCE

This application claims priority to European Application No. EP 23210675.7, filed Nov. 17, 2023, the entirety which is hereby incorporated by reference.

FIELD OF THE INVENTION

The present invention is directed to a radome of or for a radar device. Further, the invention is directed to a radar device comprising such a radome, a cladding component comprising such a radar device or such a radome, and a vehicle equipped with such a radar device and/or such a cladding component.

BACKGROUND OF THE INVENTION

Radar devices for environmental monitoring are widely used in modern motor vehicles, especially in the course of the advancing capability for (partially) autonomous driving. Long-range radar transceivers are usually operated in the frequency range between 72 GHz and 96 GHz and short-range radar transceivers in the frequency range around 24 GHz. Generally, radar transceivers may also be operated at frequencies above 100 GHz and in particular in a frequency range between 130 GHz and 150 GHz where a better resolution of objects in the surroundings of the vehicle may be obtained compared to the lower frequency range.

Such radar devices usually comprise radar transmitters and receiver elements that are arranged close to each other, often integrated in the same unit. Such a unit may be a radar transceiver which is able to emit radar waves and to receive the radar waves reflected by objects in the environment of the given vehicle. To protect the radar transceivers from environmental and weather influences, they are covered by suitable radomes, which are designed as lid-shaped or dome-shaped covers. The radomes may be integrated into cladding components of a given vehicle such as into larger exterior vehicle body panels, such as front-of-the-car panels or front shields. Usually, radomes are visible from outside as they protrude from the respective cladding components. However, radomes may be integrated into a panel from which they do not protrude. In this case they may be a seamless part of the panel and not visually be distinguishable. In order to avoid an impairment of the radar surveillance, the radomes must be designed in such a way that they have as little detrimental interaction as possible with transmitted radar waves of the aforementioned frequency ranges. The interaction may result of an attenuation of the radiation intensity, which is dependent on the material and wall thickness of the radome and can become significant in particular with metallic coatings, for example decorative elements made of chrome. Moreover, the attenuation increases with the higher number of surfaces on which the radar waves impinge when penetrating the radome. The relevant surfaces may be provided by any unit the radar waves have to penetrate. In many cases, the surfaces are provided by layers or foils that are typically used for providing the radome with a specific appearance or specific properties. When reference is made to layers or foils in the following, they may also be considered as units.

Radomes typically comprise at least two layers, namely a cover member and at least one structural member on which the cover member is mounted. The cover member is exposed to the environment, while the structural member in particular in illuminated radomes serves as a light guide for guiding the light that is provided by a light source inside the radome. In this case, the structural member is also referred to as optical lens. In sophisticated designs, the radome is illuminated in such a way that the brand logo is particularly prominent at night. For example, the brand logo can be formed by translucent areas of the radome or the brand logo stands out as an opaque pattern against an illuminated background. However, the structural members may also serve as a structural element for reinforcing the radome. It may also serve for homogenizing the thickness of the cover layer for improving the radar performance.

Moreover, a housing is provided by which the radome can be fastened to the respective parts of the vehicle, mostly either to the chassis or to a cladding component, in particular of an external cladding component, of the given vehicle. Radomes can be arranged in almost any areas of the vehicle such as on A-pillars or on the bumpers. However, in almost all cases at least one radome is arranged in the front end of the vehicle and mounted to a grille or a fascia.

In known radomes, the radar waves thus have to penetrate at least three units, namely the housing, the structural member and the cover member. Each of these units impose an attenuation on the radar waves, thereby reducing the radar performance of the radar device. In particular, the resolution of objects in the surroundings of a given vehicle and the detection range of the radar device are reduced. As mentioned, radar devices of sufficient radar performance are a key component in the capability of autonomous driving. Such radomes are disclosed in DE 10 2018 009 270 A1 A2, WO 2021/047772 A1 and EP 3 563 449 B1.

BRIEF SUMMARY OF THE INVENTION

It is therefore one task of one embodiment of the present invention to present a radome having further improved radar performance. Furthermore, an embodiment of the present invention has the object to provide a radar device comprising such a radome and to provide a cladding component for a vehicle with such a radar device. Beyond that, the present invention has the object to present a vehicle being equipped with such a radar device and/or with such a cladding component.

According to an embodiment the radome for a radar device of or for a vehicle comprises a cover member made of a radar-transparent resin, a structural member made of a radar-transparent resin, the cover member enclosing the structural member, the cover member and the structural member being fastened to each other in a fixing section, the fixing section being formed by the cover member or the structural member, the fixing section being protected by a protective layer, the protective layer being applied to the structural member and extending into or overlapping the fixing section, or the fixing section being formed by the cover member or a housing, the fixing section being covered by the housing or the housing extending into or overlapping the fixing section, the housing forming an opening for the radar waves.

Within the context of the present invention, the term "enclosing" is to be understood such that a complete enclosure of the structural member by the cover member is not necessary. A partial enclosure of the cover member with respect to the structural member may be sufficient. Other parts may also take part in the enclosure of the structural member For this purpose, the cover member may delimit a hollow space in which the structural member is at least partially arranged or protrudes into the hollow space.

The core aim of the present invention is to reduce the number of units, in particular the number of layers of a radome through which the radar waves generated by a radar source have to travel. This aim is reached either in that the radome is void of any housing or that the housing forms an opening for the radar waves. In both cases, however, the components of the radome are exposed to external influences which may lead to damages and thus to a reduced radar performance. According to the present invention, the fixing section in which the cover member and the structural member are fastened to each other is either protected by a protective layer or by the housing comprising the opening. For this purpose, the protective layer is applied to the structural member and either extends into the fixing section or overlaps the fixing section. In case the protective layer overlaps the fixing section, the protective layer indirectly protects the fixing section. One example may be that the structural member and the cover member are fastened to each other on a first surface of the structural member such that the fixing section is also located on the first surface, while the protective layer is arranged on the second surface of the structural member. To provide effective protection the protective layer overlaps the fixing section. In this case, the structural member takes over the function of the housing and can be used for fastening the radome to a cladding component or other areas of a given vehicle.

The fixing means by which the cover member and the structural member may be fastened to each other may provide an adhesive bond using glue, lacquer or the like, a mechanical bond using screws, clips, latches, a frictional bond by oversizing and resulting deformation of the cover member and/or the structural member, or electromagnetic bonds using magnets, electric charge or the like.

The same fixing means may be applicable in case a housing is used. In this case, the structural member and the cover member may not directly be connected to each other but with the help of the housing.

The performance of the radar device is increased as the radar waves have to penetrate less layers compared to known radomes. It should be noted that when the radar waves penetrate one layer, two interactions take place as two medium changes occur. Each interaction may cause an attenuation of the radar waves.

In a further embodiment the cover member is made of a light transparent resin, the structural member is an optical lens made of a light transparent resin, and the radome comprises a light source for illuminating the radome. The illumination of the radome enables the prominent representation of the emblem or brand logo of the vehicle manufacturer, in particular at night, twilight or in poor lighting conditions. The recognizability of the vehicle manufacturer is increased and the driver's individuality emphasized. Illuminated radomes moreover increase the travel safety. The optical lens serves as a light guide for the light inside the radome. The optical lens is designed such that most of the light is directed to the cover member, thereby providing an effective illumination.

In another embodiment the protective layer is radar transparent or radar transparent and reflective to light. In yet another embodiment the protective layer is applied to the structural member and is radar transparent or radar transparent and reflective to light. A 2K-molding process may be applied for these embodiments. The fact that the protective layer is radar transparent keeps the attenuation of the radar waves low. Further, light leakage is kept low in case the protective layer is reflective to light. The protective layer may be white paint and/or metallized. Alternatively, the protective layer may be provided by a metal-look layer or foil that achieves a high specular/diffusive reflectance.

A further embodiment is characterized in that the protective layer is opaque to light. The fact that the protective layer is reflective does not mean that it is necessarily opaque. While a certain portion of the impinging light may be reflected, another portion may be able to penetrate the protective layer. However, in this embodiment the protective layer is opaque to light which means that almost the entire light impinging on the protective layer can be reflected provided the protective layer is reflective. Thus, no light gets lost, and the radome can very efficiently be illuminated.

In a further embodiment the protective layer is a reflective foil. In this embodiment, the application of the protective layer as a foil on the structural member is facilitated such that the manufacturing of the radome is also straightforward. Moreover, the reflective foil homogenizes the light rays impinging thereon which leads to a more even illumination of the radome. The reflective foil can be translucent. The reflective function of the reflective protective layer and in particular of the reflective foil can be provided by white paint, white PC/PMMA (polycarbonate/polymethylmethacrylate), white lacquer, white tampon or pad print, white screen print and/or metallized and/or using a red pigment. The red pigment is particularly useful when the brand logo is to be arranged on the rear of the vehicle.

The reflective foil can be specular, diffusive, or a combination. Reflective surface can extend over whole area, or just parts of the surface in any shape. However, it should be noted that the reflective foil is not necessarily diffusive in all cased. Foils of a combined reflectivity and diffusivity may be provided using a foil and a white PC (polycarbonate).

Alternatively, the protective layer may be partly translucent on the first surface of the structural member. The first surface is the surface facing the cover member.

In a further embodiment, the optical lens can comprise a diffusive material that further optimizes light performance. The diffusive material may be included in other sections of the structural element if needed for optical optimization.

According to a further embodiment, the light source is fastened to the cover member or to the structural member or to the housing.

Regarding the arrangement of the light source, the radome offers high flexibility such that the freedom of design is extensive.

In another embodiment the cover member comprises an outer surface and an inner surface, and a decorative layer is applied to the inner surface and/or to the outer surface. By means of the decorative layer, any desired shape can be generated on the cover layer, in particular the brand logo of the vehicle manufacturer which can be illuminated by the light source. The shape can be changed in a fairly easy way. The decorative layer can be multi-layered, e.g., layer of metallization (such as Indium), color paint/lacquer, white paint, print or the like, depending on the desired design. It is also possible to apply the decorative layer on the outer surface. The decorative layer and the protective layer applied to the cover lens can be separated, one placed on the outer surface and the other on the inner surface.

In a further embodiment the decorative layer has the same composition as the protective layer. As the same material and/or shape can be used for the decorative layer and the protective layer, the manufacturing process of the radome is facilitated. However, typically the decorative layer is metallized or white and optimized for light reflection which is usually not the case for the protective layer.

In another embodiment a radar-transparent lacquer is applied to the outer surface. Depending on the desired appearance of the final radome, the cover lens can additionally be treated with metallization, paint or other materials, that provide the desired pigmentation. The outer surface of such a radome is usually treated using a hard-coat lacquer or by Polyurethane coating (PUR) by which the radome can be protected against outer influences such as stone chipping. The use of polyurethane coating is particularly suitable when using injection molding.

According to a further embodiment a gap is formed between the cover member and the structural member. The gap is typically filled with air but may also be filled with a resin. In case the gap is filled with air, a medium change is created which is important for the optical function as it maintains the conditions for total internal reflection in the structural member when embodied as an optical lens. If the gap is filled with a resin, its refractive index should be lower than the one of the optical lens.

In another embodiment the radome comprises a heating unit for heating the radome. The radar performance may be deteriorated by ice formation in particular on the outer surface of the cover member. The ice can be removed using the heating unit. The heating unit may be arranged on the outer surface of the cover member where it is very effective for removing ice or condensed water. However, the heating unit may also be fastened to the housing such that the entire radome can be homogenously heated. It should, however, be noted that the heating unit may also be arranged on any surface of the radome, in particular between the cover member and the housing. Beyond that, the heating unit can also be molded into the structural member.

Another aspect of the invention is directed to a radar device of or for a vehicle, comprising a radome according to one of the embodiments previously discussed and a radar source for providing radar waves.

A further aspect of the invention is directed to a cladding component comprising a radome according to one of the embodiments previously discussed and/or a radar device according to the embodiment previously presented.

Yet another aspect of the present invention is directed to a vehicle that comprises a radome according to one of the embodiments previously discussed and/or a radar device according to the embodiment previously presented and/or a cladding component as described above.

The technical effects and advantages as discussed regarding the present radome to a large extend also apply to the radar device, the cladding component and the vehicle. Briefly, as the number of units, in particular the number of layers the radar waves have to penetrate is reduced, the radar performance is increased. Thus, in particular the detection range and the resolution provided by the radar device are increased.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
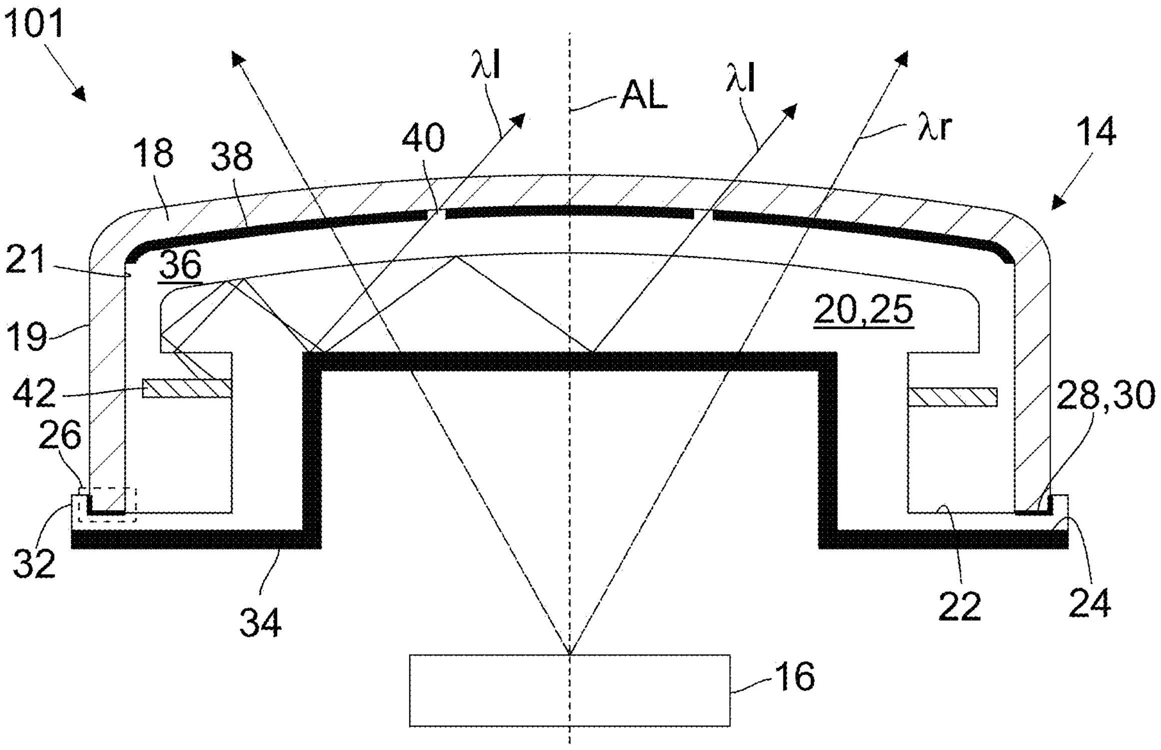
FIG. 1 shows a first embodiment of a radar device according to the invention.
Figure 4:
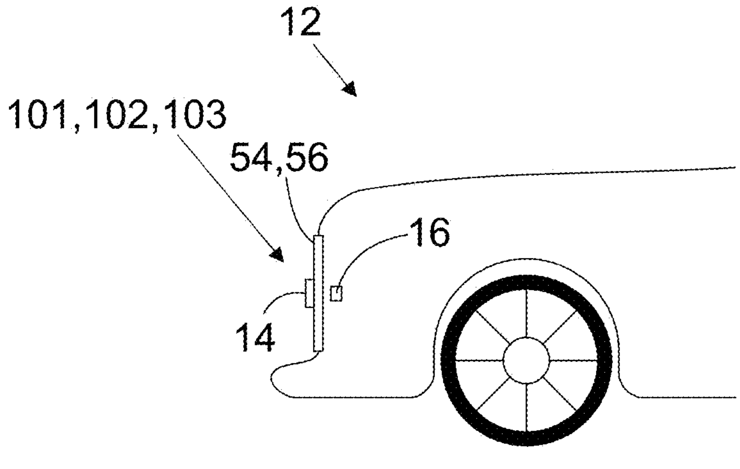
FIG. 4 shows a vehicle equipped with a radar device according to one of the shown embodiments.

FIG. 1 shows a first embodiment of a radar device 101 according to the present invention which can be used for a vehicle 12 (see FIG. 4). The radar device 101 comprises a radome 14 and a radar source 16 for generating radar waves λr. The radome 14 is arranged at or near the front end of the vehicle 12, while the radar source 16 is placed towards the center of the vehicle 12 (see FIG. 4). The radar device 101 defines a longitudinal axis AL.

The radome 14 has a cover member 18 and a structural member 20, the latter being embodied as an optical lens 25. For this purpose, the optical lens 25 is made of a light transparent resin. The same is true for the cover member 18. The cover member 18 has an outer surface 19 and an inner surface 21. The cover member 18 and the optical lens 25 are preferably made of radar transparent resin. In other words, light rays λl and radar waves λr can penetrate the cover member 18 and the optical lens 25.

The optical lens 25 forms a first surface 22 and a second surface 24. The first surface 22 is facing the cover member 18 while the second surface 24 is directed towards the radar source 16. The cover member 18 and the optical lens 25 are fastened to each other in a fixing section 26 by fixing means 28. The fixing section 26 is provided on the first surface 22 of the optical lens 25. In the first embodiment a glue 30 is used as fixing means 28 such that a material bond is generated. However, other fixing means 28 like screws, clips, latches, magnets, welding or the like (not shown) may be used. In this case, additional parts like sealing elements and gaskets can be provided in particular in the fixing section 26. The fixing section 26 is formed by the optical lens 25 which comprises a radially outer rim 32 into which the cover member 18 can be inserted. The rim 32 positions the cover member 18 relative to the optical lens 25. In the connected state, the cover member 18 encloses almost the entire optical lens 25.

A protective layer 34 is applied to the second surface 24 of the optical lens 25 and thus also being oriented to the radar source 16. The protective layer 34 is radar transparent and reflective to light and opaque. In the shown embodiments the protective layer 34 may be a white paint The protective layer 34 can cover the entire second surface 24 and thus extends to the rim 32 of the optical lens 25. However, a partial covering is also possible. In the radial direction, i.e., perpendicular to the longitudinal axis AL, the protective layer 34 overlaps the fixing section 26. The radome 14 and in particular the optical lens 25 is shielded by the cover member 18 against impacts originating from the front and the side while the protective layer 34 protects the optical lens 25 against impacts from the back.

A gap 36 is formed between the optical lens 25 and the cover member 18. Moreover, a decorative layer 38 is applied on the inner surface 21 of the cover member 18. Alternatively or cumulatively, the decorative layer 38 can also be applied on the outer surface 19. The decorative layer 38 is provided with cut-outs 40 that follow a certain shape, i.e., the brand logo of the vehicle 12 manufacturer. Beyond that, a light source 42 is fastened to the optical lens 25 by which light rays λl can be generated.

In FIG. 1 the way of travel of the radar waves λr and the light rays λl is indicated. The radar waves λr generated by the radar source 16 are leaving the same within a cone shaped volume and penetrate the optical lens 25 and the cover member 18. Thus, the radar waves λr only have to penetrate these two units. The light rays λl leaving the light source 42 first enter the optical lens 25 and are reflected by the protective layer 34. As mentioned, a gap 36 is formed between the optical lens 25 and the cover member 18. Thus, the first surface 22 of the optical lens 25 is limiting the gap 36. Therefore, the light rays λl arriving at the first surface 22 from the interior of the optical lens 25 are to a large extent totally reflected and thus remain inside the optical lens 25 which therefore acts as a light guide. The light rays λl run through the cut-outs 40 and penetrate the cover member 18 such that the radome 14 is illuminated according to the shape of the decorative layer 38. The optical lens 25 may be provided with outcoupling sections 58 (see FIG. 3) by which the light rays λl may be coupled out of the optical lens 25. The outcoupling sections 58 may be located adjacent or aligned with the cut-outs 40 to increase the portion of the out-coupled light rays λl in the area of the cut-outs 40.

Figure 3:
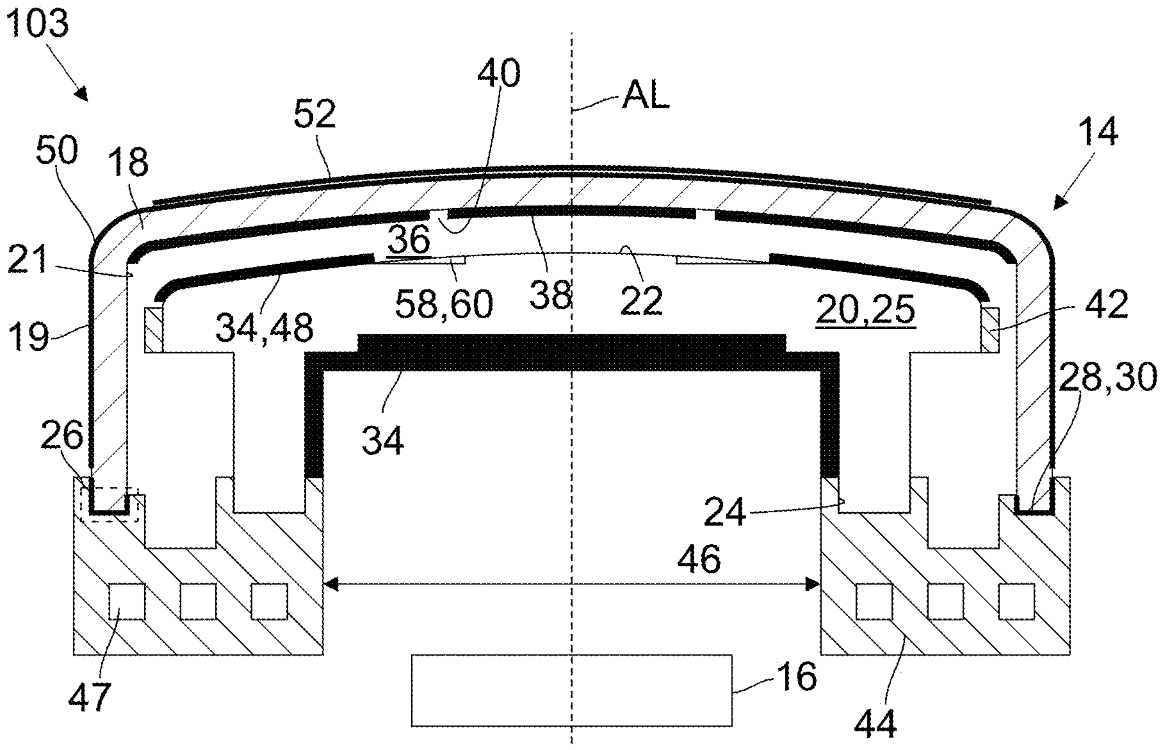
FIG. 3 shows a third embodiment of the radar device according to the invention.

As shown, the protective layer 34 has a planar shape throughout the back side of the structural member 20 with constant thickness, or it may increase in thickness in outcoupling sections 58 to improve light efficiency and homogeneity (see FIG. 3).

Figure 2:
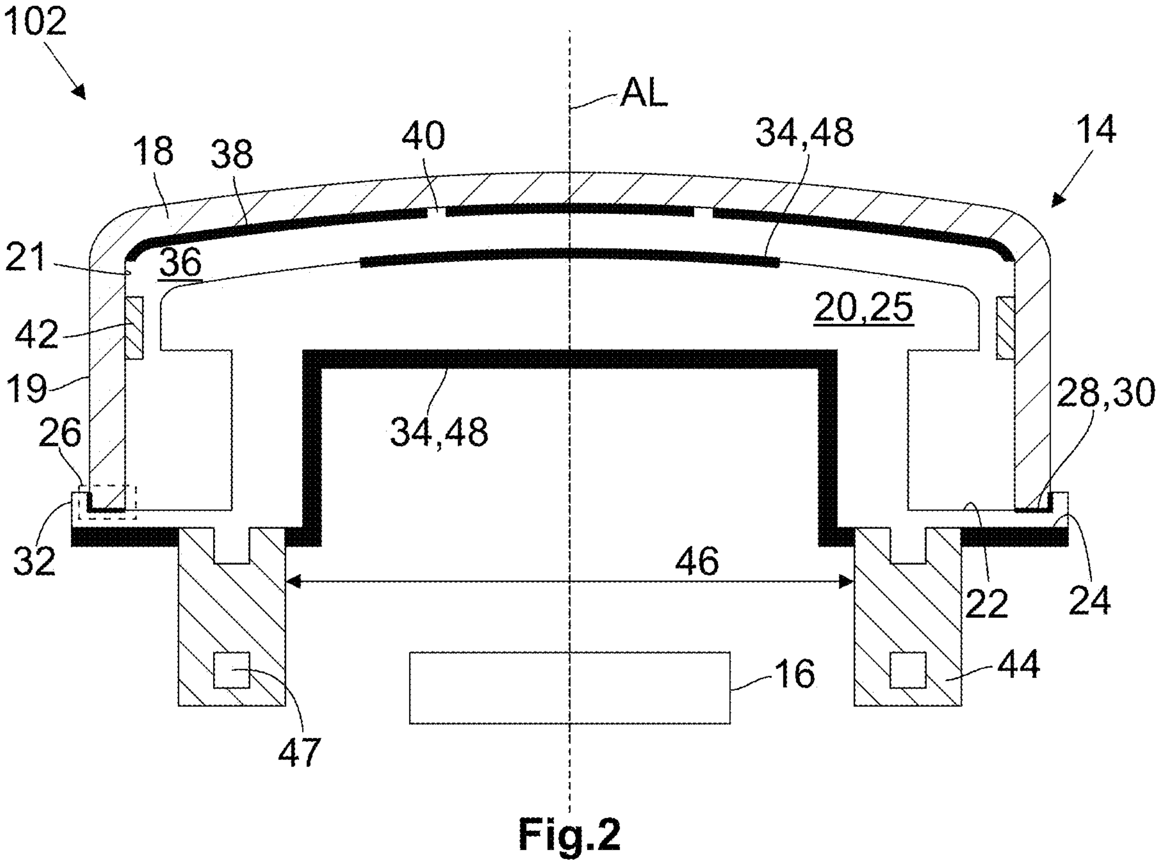
FIG. 2 shows a second embodiment of the radar device according to the invention.

FIG. 2 shows a second embodiment of a radar device 102 according to the present invention. The basic layout of the radar device 102 according to the second embodiment is to a large extent similar to the layout of the radar device 101 according to the first embodiment, so only the main difference will be described in the following. The cover member 18 and the optical lens 25 are fastened to each other in the same way as in the first embodiment of the radar device 101. One of the main differences is that the radome 14 comprises a housing 44 that is fastened to the optical lens 25. The fixing means 28 used for fastening the cover member 18 to the optical lens 25 can also be employed for fastening the housing 44 to the optical lens 25. The housing 44 forms an opening 46 through which the radar waves λr can travel. The protective layer 34 is interrupted by the housing 44. As described for the first embodiment of the radar device 101, the protective layer 34 extends to the rim 32 of the optical lens 25. In the radial direction, i.e., perpendicular to the longitudinal axis AL, the protective layer 34 overlaps the fixing section 26. The light source 42 is arranged on the inner surface 21 of the cover member 18.

In the second embodiment of a radar device 102, the first surface 22 of the optical lens 25 is partially covered with the protective layer 34. The protective layer 34 is provided as a diffusive foil 48 that is light permeable and homogenizes the light rays λl impinging thereon. Accordingly, the protective layer 34 is arranged in the center of the radome 14. The cut-outs 40 of the decorative layer 38 of the cover member 18 are also arranged in the center of the radome 14. The light rays λl that exit the optical lens 25 via the diffusive foil 48 can almost directly pass through the cut-outs 40, thereby providing an efficient and homogeneous illumination of the radome 14 according to the shape of the cut-outs 40.

FIG. 3 shows a third embodiment of a radar device 103 according to the present invention. Again, only the main differences regarding the first embodiment of the radar device 101 will be described in the following. In the third embodiment, the cover member 18 and the optical lens 25 are not directly connected with each other. Instead, they are indirectly connected to each other by the housing 44. Accordingly, the fixing section 26 is formed by the housing 44 in which the housing 44 is connected to the cover member 18 by fixing means 28 as described above. Radially inwards of the fixing section 26 the housing 44 is fastened to the optical lens 25. Also in this case, the same fixing means 28 for fastening the optical lens 25 to the housing 44 may be employed.

As the fixing section 26 is formed by the housing 44, it is not necessary that the protective layer 34 extends radially outwards. Instead, only the free second surface 24 is covered by the protective layer 34. In this case, not only the protective layer 34 but also the housing 44 shield the optical lens 25 and the cover member 18 against impacts from the back.

Also in this case the housing 44 forms the opening 46 such that the radar waves λr only have to penetrate the optical lens 25 and the cover member 18.

The housing 44 of the third embodiment of the radar device 103 is equipped with connecting sections 47 by which the housing 44 and thus the entire radome 14 can be fastened to the vehicle 12 or to a cladding component 54 of the vehicle 12.

In the third embodiment of the radar device 103 the first surface 22 of the optical lens 25 is partially covered with the protective layer 34. In this case it is not the protective function but the opaqueness why the protective layer 34 is applied on the first layer. As mentioned, the decorative layer 38 applied to the inner surface 21 of the cover member 18 has some cut-outs 40 that define a certain shape. As evident from FIG. 3, the cut-outs 40 are located in the center of the radome 14 while the protective layer 34 is applied at the radial outer area of the optical lens 25. Thus, the light rays λl can exit the optical lens 25 mainly in the center of the radome 14 where the cut-outs 40 are arranged. Light leakage and light losses can thereby be minimized.

In this embodiment, the structural member 20 is provided with outcoupling sections 58. Moreover, the thickness of the protective layer 34 increases in the area of the outcoupling sections seen along the longitudinal axis AL to improve light efficiency and homogeneity. Additionally, the outcoupling sections 58 include a diffusive material 60 that further optimizes light performance. Such elements may be included in other sections of the structural member 20 if needed for optical optimization. It should, however, be noted that the optical lens 25 may also be void of a diffusive material; or the reflective foil 48 is diffusive; or the structural member 20 and in particular the optical lens 25 is fully diffusive; or the optical lens 25 is clear and only in the outcoupling section 58 the optical lens 25 comprises a diffusive material 60 and is thus partially diffusive as shown in FIG. 3.

The light source 42 of the third embodiment of the radar device 103 is arranged on the optical lens 25. Moreover, a heating unit 50 is provided on the outer surface 19 of the cover member 18. The heating unit 50 serves for removing ice that may form at low temperatures. Moreover, condensed water that may form inside the radome 14 may be evaporated by the heating unit 50 and consequently be removed.

Further, a radar-transparent lacquer 52 is applied to the outer surface 19 of the cover member 18 or to the heating unit 50. The radar-transparent lacquer 52 is also transparent to light such that the light rays λl can exit the radome 14. The lacquer 52 can be a hard coating which protects the cover member 18 from impacts originating from the surroundings of the radome 14.

FIG. 4 is a principle sketch of the front portion of a vehicle 12 that is equipped with a radar device 101, 102, 103 according to one of the embodiments previously presented. The radome 14 is fastened to a cladding component 54 of the vehicle 12, in this case to its front grille 56. Thus, the radome 14 is arranged at or near the front end of the vehicle 12, while the radome 14 is placed towards the center of the vehicle 12.

| REFERENCE LIST | |
|---|---|
| 101, 102, 103 | radar device |
| 12 | vehicle |
| 14 | radome |
| 16 | radar source |
| 18 | cover member |
| 19 | outer surface |
| 20 | structural member |
| 21 | inner surface |
| 22 | first surface |
| 24 | second surface |
| 25 | optical lens |
| 26 | fixing section |
| 28 | fixing means |
| 30 | glue |
| 32 | rim |
| 34 | protective layer |
| 36 | gap |
| 38 | decorative layer |
| 40 | cut-outs |
| 42 | light source |
| 44 | housing |
| 46 | opening |
| 47 | connecting section |
| 48 | reflective foil |
| 50 | heating unit |
| 52 | lacquer |
| 54 | cladding component |
| 56 | front grille |
| 58 | outcoupling sections |
| 60 | diffusive material |
| λl | light rays |
| λr | radar waves |
| AL | longitudinal axis |

The invention claimed is:

1. A radome for a radar device for a vehicle, the radome comprising:

a cover member made of a radar-transparent resin;

a structural member made of a radar-transparent resin, wherein the structural member comprises an optical lens, and wherein a gap is defined between the cover member and the optical lens;

the cover member enclosing the structural member;

the cover member and the structural member being fastened to each other in a fixing section;

at least one of:

the fixing section being formed by the cover member or the structural member, the fixing section being protected by a protective layer, the protective layer being applied to the structural member and extending into or overlapping the fixing section, or the fixing section being formed by the cover member or a housing, the fixing section being covered by the housing or the housing extending into or overlapping the fixing section, the housing forming an opening for radar waves (λr).

2. The radome according to claim 1, wherein the cover member is made of a light transparent resin, the optical lens is made of a light transparent resin, and the radome further comprises a light source for illuminating the radome.

3. The radome according to claim 1, wherein the optical lens includes a diffusive material that optimizes light performance.

4. The radome according to claim 2, wherein the light source is fastened to at least one of: the cover member or the structural member or the housing.

5. The radome according to claim 1, wherein at least one of:

the protective layer is radar transparent, or radar transparent and reflective to light, or a protective layer is applied to the structural member and is at least one of radar transparent, or radar transparent and reflective to light.

6. The radome according to claim 5, wherein the protective layer is opaque to light.

7. The radome according to claim 5, wherein the protective layer is reflective and comprises at least one of white PC/PMMA, white lacquer, white tampon or pad print, white screen print or metallized or a red pigment.

8. The radome according to claim 5, wherein the protective layer is a reflective foil.

9. The radome according to claim 1, wherein the cover member includes an outer surface and an inner surface, and a decorative layer is applied to the inner surface and/or to the outer surface.

10. The radome according to claim 9, wherein the decorative layer has the same composition as the protective layer.

11. The radome according to claim 9, wherein a radar-transparent lacquer is applied to the outer surface.

12. The radome according to claim 1, further comprising a heating unit for heating the radome.

13. A radar device for a vehicle, the radar device comprising:

a radome according to claim 1; and a radar source for providing radar waves (λr).

14. A cladding component for a vehicle, the cladding component comprising:

a radar device according to claim 13.

15. The radome according to claim 1, wherein the radome further comprises a light source for illuminating the radome, wherein the optical lens is configured to direct light from the light source toward the cover member.

16. The radome according to claim 15, wherein the optical lens has a first surface that faces the cover member and a second surface opposite the first surface, wherein the protective layer is applied to the second surface of the optical lens, wherein the protective layer is configured to reflect the light from the light source toward the cover member.

* * * * *